Nov. 29, 1955  C. J. CARTWRIGHT  2,725,092
ADJUSTABLE SEAT TRACK ASSEMBLY
Filed Jan. 19, 1953  4 Sheets-Sheet 4
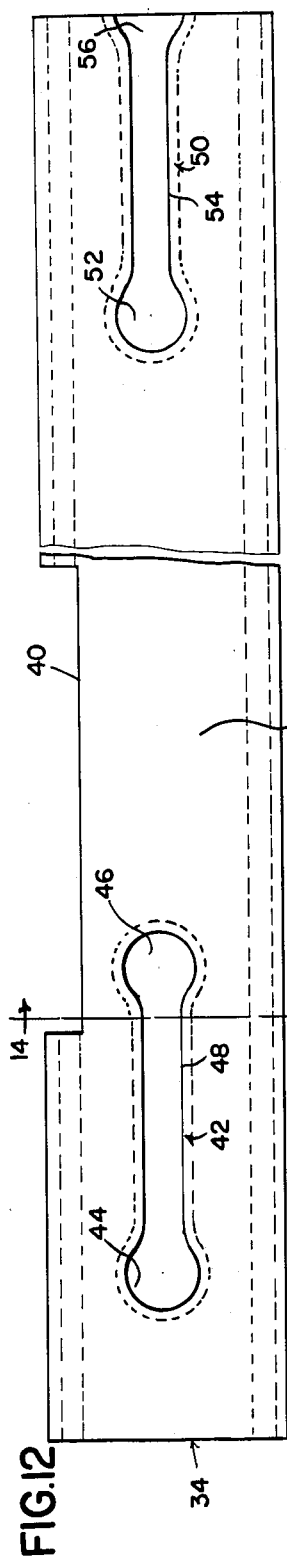
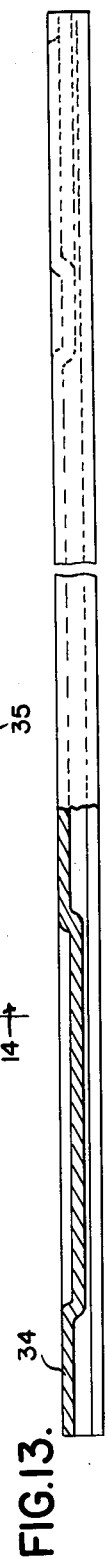
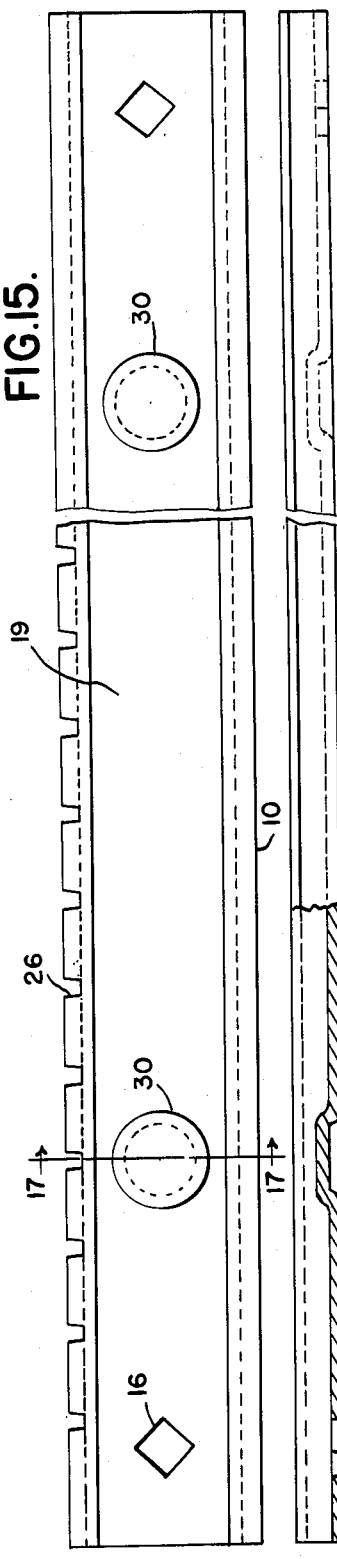
INVENTOR.
CLIFFORD J. CARTWRIGHT
BY Whittemore,
Hulbert &
Belknap
ATTORNEYS

United States Patent Office 2,725,092
Patented Nov. 29, 1955

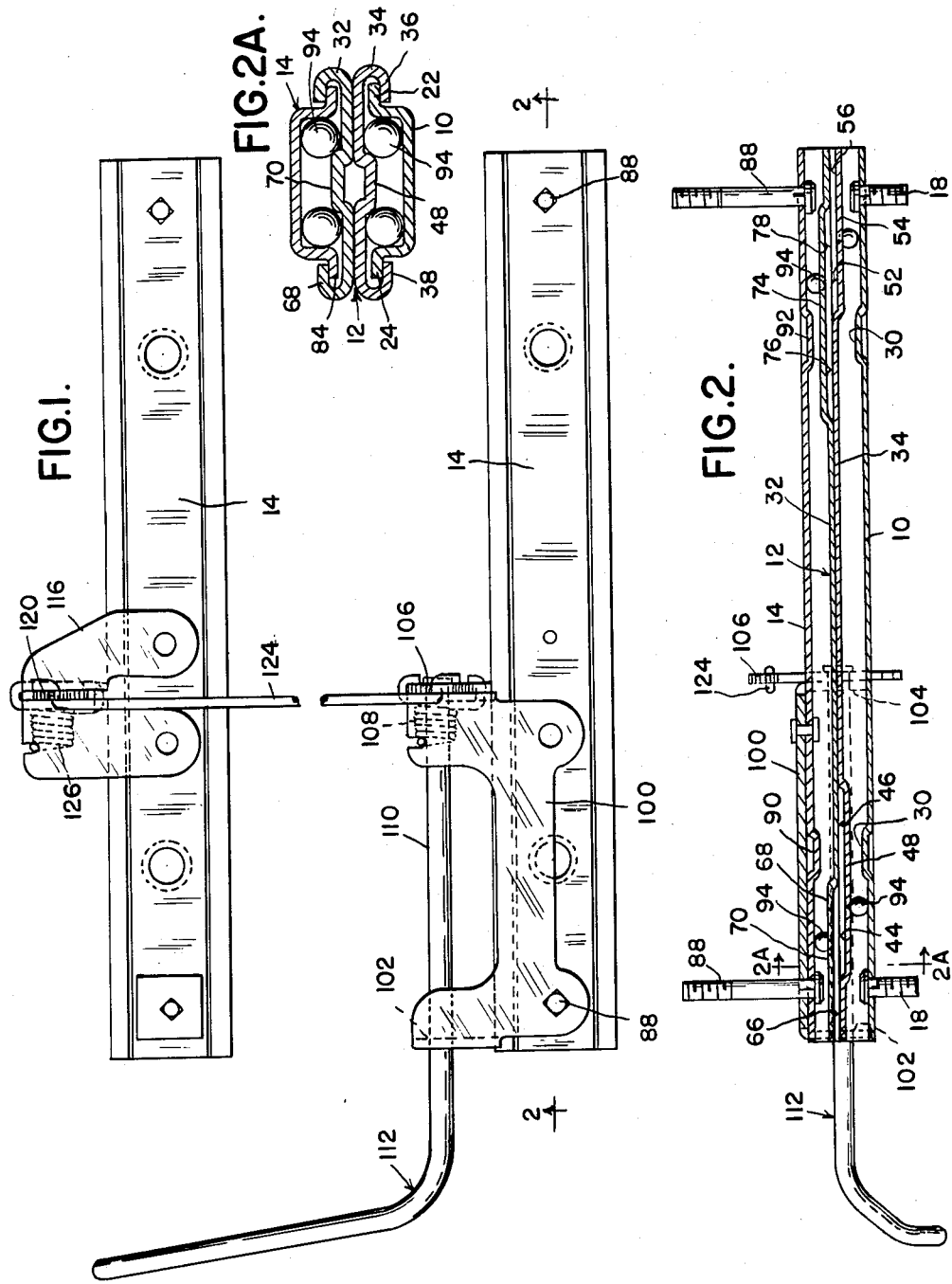

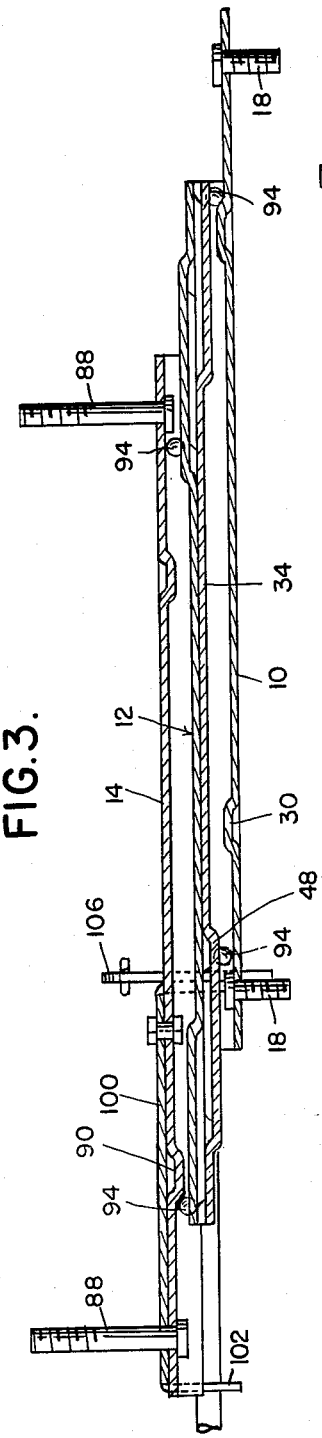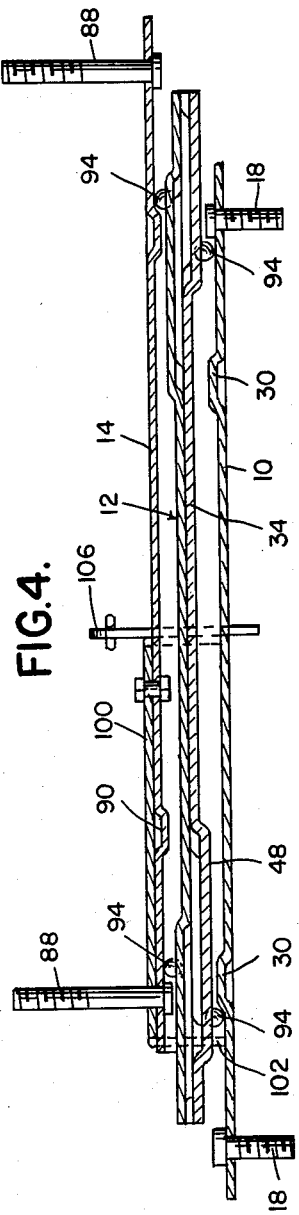

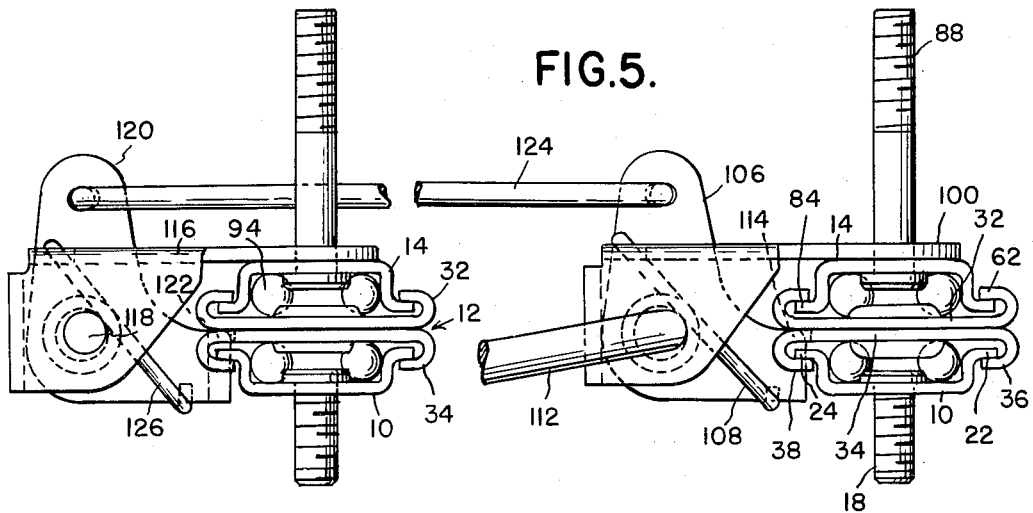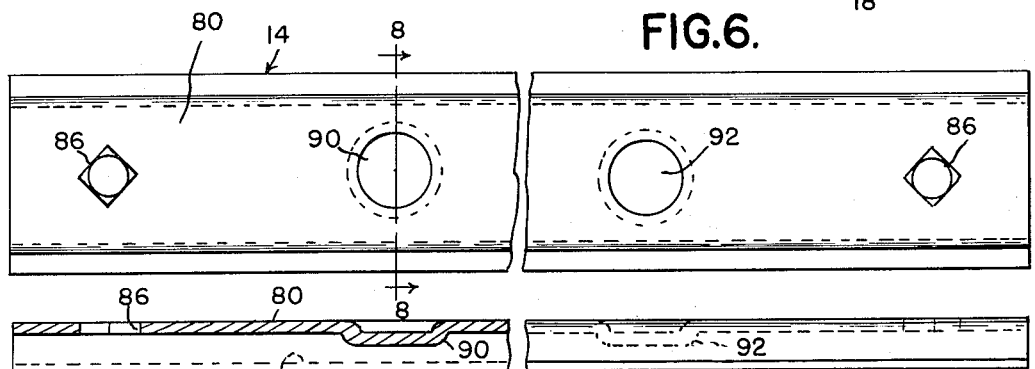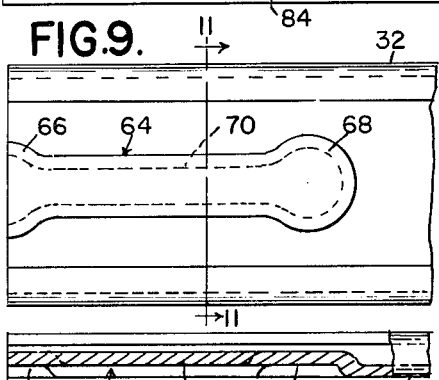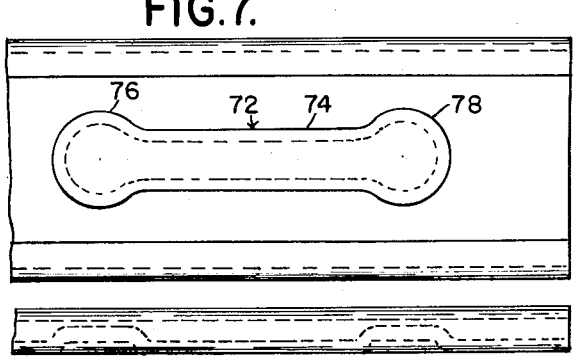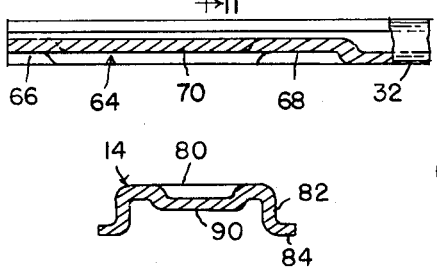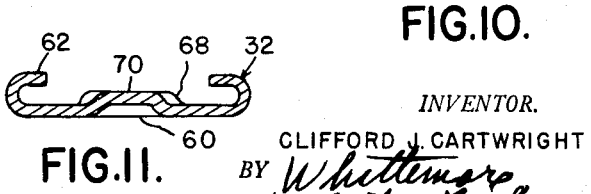

2,725,092

ADJUSTABLE SEAT TRACK ASSEMBLY

Clifford John Cartwright, Keego, Mich., assignor to American Forging & Socket Company, Pontiac, Mich., a corporation of Michigan Application January 19, 1953, Serial No. 332,010

10 Claims. (Cl. 155—14)

The present invention relates to an adjustable seat track assembly, and more particularly to an adjustable seat track assembly comprising a right and left hand track intended for use in an automotive vehicle.

It is an object of the present invention to provide a seat track assembly characterized by a relatively large range of longitudinal adjustment on a comparatively short track.

It is a further object of the present invention to provide a seat track assembly of the character described characterized by its simplicity and the economy with which it may be produced.

It is a further object of the present invention to provide a seat track assembly of the character described comprising a plurality of tracks formed essentially of sheet metal including embossed web portions defining ball or roller receiving trackways when assembled together.

It is a further object of the present invention to provide a seat track assembly of the character described comprising lower intermediate and upper tracks formed to provide cooperating raceways between the lower and intermediate tracks and between the intermediate and upper tracks, the raceways including abutments at the ends thereof engageable by balls or rollers received in said trackways to limit relative longitudinal movement between said trackways.

Other objects and features of the invention will become apparent as the description proceeds, especially when taken in conjunction with the accompanying drawings, wherein:

Figure 1 is a plan view of the novel trackway.

Figure 2 is a longitudinal section on the line 2—2, Figure 1.

Figure 2A is an enlarged section on the line 2A—2A, Figure 2.

Figure 3 is a sectional view similar to Figure 2 illustrating the upper track in its extreme forward position.

Figure 4 is a sectional view similar to Figure 2 showing the upper track in its extreme rearward position.

Figure 5 is a front elevation of the trackway.

Figure 6 is a plan view of the upper trackway.

Figure 7 is a side elevation of the upper track member shown in Figure 6, partly in section.

Figure 8 is a section on the line 8—8, Figure 6.

Figure 9 is a plan view of the upper member of the intermediate track.

Figure 10 is a side elevation of the upper member of the intermediate track, partly in section.

Figure 11 is a section on the line 11—11, Figure 9.

Figure 12 is a plan view of the lower member of the intermediate track.

Figure 13 is a side elevation of the lower member of the intermediate track, partly in section.

Figure 14 is a section on the line 14—14, Figure 12.

Figure 15 is a plan view of the lower track.

Figure 16 is a side elevation of the lower track, partly in section.

Figure 17 is a section on the line 17—17, Figure 15.

The trackway comprises a lower track 10, an intermediate track indicated generally at 12, and an upper track 14. The lower track 10 as illustrated in detail in Figures 15, 16 and 17, is provided adjacent its ends with openings 16 which are adapted to receive bolts 18 by means of which the lower track is clamped in position on the floor of a vehicle. The track 10 is generally in the form of an inverted channel as best seen in Figure 17, having an intermediate horizontal web 19 provided with upwardly extending flanges 20 and outwardly extending flanges 22 and 24, the flange 24 being provided with a plurality of notches 26, as best seen in Figure 15. Intermediate the ends of the lower track 10 are upwardly extending embossments 30 which are illustrated as of circular configuration but which may be of any suitable shape. These embossments operate as abutments, as will later be described.

The intermediate track, indicated generally at 12, comprises upper and lower track members 32 and 34 which are separately formed as will subsequently be described, and are then permanently assembled together as by welding. The lower member 34 of the intermediate track 12 is illustrated in detail in Figures 12, 13 and 14. This member comprises a horizontal central web 35 provided with downwardly and inwardly turned flange portions 36 and 38, the flange portion 38 being cut away as indicated at 40. Adjacent the forward end of the lower member 34 of the intermediate track is an embossment 42 which comprises laterally enlarged end portions 44 and 46 and an intermediate straight elongated portion 48. As will subsequently be described, the laterally enlarged end portions 44 and 46 constitute bearing stops and the intermediate elongated portion 48 constitutes a separator for bearings. The rear end of the lower member 34 of the intermediate track comprises an embossment 50 having a laterally enlarged forward end portion 52, a straight portion 54, and a laterally enlarged end portion 56 which is at the extreme rearward end of the member 34. Again, as will subsequently be described, the lateral enlargements 52 and 56 constitute bearing abutments and the elongated intermediate portion 54 constitutes a bearing separator.

The upper member 32 of the intermediate track 12 is illustrated in detail in Figures 9, 10 and 11. The member 32 comprises a central web 60 provided with upwardly and inwardly turned flanges 62. The web 60 is provided with an upwardly extending embossment 64 at the forward end thereof, the embossment 64 having a lateral enlargement 66 at its forward end and a lateral enlargement 68 at its rear end. The laterally enlarged portions 66 and 68 are interconnected by a straight portion 70. Enlargements 66 and 68 constitute bearing abutments and the straight intermediate portion 70 constitutes a bearing separator, as will subsequently be described. Adjacent the rear end of the member 32 is an embossment 72 comprising a straight intermediate portion 74, a laterally extending embossment 76 at the forward end thereof, and a second laterally extending embossment 78 adjacent the rear end thereof. Members 76 and 78 constitute bearing stops or abutments and the elongated straight portion 74 of the abutment constitutes a bearing separator.

The upper track member 14, as best illustrated in Figures 6, 7 and 8, comprises a horizontal web 80 provided with downwardly extending flanges 82 and outwardly extending flanges 84. The web 80 adjacent its ends is provided with openings 86 for receiving bolts 88 by means of which a seat construction may be secured to the upper track or rail 14. Spaced inwardly from the end openings 86 are downwardly extending embossments 90 and 92, the embossment 90 being located adjacent the forward end of the track or rail 14 and the embossment 92 being located adjacent the rear end of the track 14.

As previously mentioned, the upper and lower members 32 and 34 of the intermediate track 12 are initially shaped as above described, and are then assembled together in the manner best illustrated in Figures 2A and 5, in which position they may be interconnected by welding or the like. The several tracks are assembled together with the flanges 36 and 38 of the lower member 34 of the intermediate track receiving the flanges 22 and 24 respectively of the lower track 10, and the flanges 62 of the upper member 32 of the intermediate track receiving the flanges 84 of the upper track 14. In the preferred embodiment of the invention the intermediate track 12 is separated from the lower track 10 and from the upper track 14 by pairs of balls 94 which are received in the raceways intermediate the several tracks. Obviously, instead of balls, bearings in the form of cylinders could be employed. In any case, the bearings 94 support the intermediate track 12 for rolling motion longitudinally on the fixed lower track 10 and in like manner support the upper track 14 for rolling motion longitudinally with respect to the intermediate track 12. The inter-engaging flanges 22, 24; 36, 38; 62 and 84 prevent separation between the tracks in a vertical sense.

Referring now to Figure 2, the several track members are illustrated in an intermediate position and in this position the balls 94 are intermediate the several end abutments of the raceways. Thus, the balls 94 at the forward end of the track assembly and intermediate the lower track 10 and the intermediate track 12 are separated by the portion 48 of the embossment 42 and are intermediate lower abutments 30 and an abutment provided by the bolt 18 and upper abutments 44 and 46. In like manner, the balls 94 intermediate the rear ends of the lower track 10 and the intermediate track 12 are separated by the portion 54 of the embossment 50 and are intermediate the lower abutments constituted by the rear embossment 30 and the bolt 18, and between upper abutments 56 and 52. In like manner, the balls at the forward end of the track assembly between the intermediate track 12 and the upper track 14 are separated by the longitudinally extending portion 70 of the embossment 64 and are spaced from lower abutments 66 and 68 and between upper abutments constituted by the embossment 90 and the head of the screw 88. The balls 94 at the rear of the track assembly and between the intermediate track 12 and the upper track 14 are separated by the longitudinally extending portion 74 of the embossment 72 and are positioned between lower abutments provided by the laterally enlarged embossments 76 and 78 and between upper abutments provided by the embossment 92 and the head of the bolt 88.

It is thus seen that the raceways provided by embossments on the web portions of the track members include end abutments formed either by portions of the embossments or by the heads of the bolts or rivets used in assembling the trackway.

Referring now to Figure 3, the parts are illustrated when the upper track 14 is in its extreme forward position, the intermediate track 12 also having moved to its extreme forward position. The lower track 10 of course remains fixed to the floor of the vehicle. It will be observed that in the limiting position the balls 94 have all rolled into limiting positions where they engage the end abutments of the raceways provided intermediate the tracks and thus constitute rigid abutments preventing further movement of the upper track 14 forwardly. It will also be observed in this figure that the tracks are in such position that the forward upwardly extending bolt 88 and the rearward downwardly extending bolt 18 may be inserted directly in their respective tracks, thus permitting insertion of the upper forward pair of balls 94 and the lower rear pair of balls 94 when the track parts are in this position.

In Figure 4 the parts are illustrated in the position occupied when the upper track 14 has moved to its extreme rearward position, the intermediate track 12 also having moved to its extremely rear position relative to the fixed lower track 10. At this time it will be observed that the tracks are in such relative position that the rear upwardly extending bolt 88 may be inserted directly into the upper track 12 and the forward downwardly extending bolt 18 may be inserted into the opening provided therefor at the forward end of the lower track 10. This arrangement therefore provides a ready means of assembling the tracks which may be simply slipped together with the respective flanges overlapping, as best illustrated in Figure 5. With the parts in a position corresponding to Figure 3 or approximately this position, the upper forward and the lower rear pairs of balls may be inserted. Movement of the track from the position shown in Figure 3 to the position shown in Figure 4 will roll the previously inserted balls into the proper position and final movement to this position may be accompanied by some sliding motion of the balls to bring them into proper position. At this time the upper rear and the lower forward pairs of balls may be inserted, after which the rear bolt 88 and the forward bolt 18 may be inserted. Thereafter, sliding movement of the tracks or rails will be accompanied by true rolling motion of the balls throughout the travel of the rails, thus insuring maximum freedom of movement.

Suitable means are provided for latching or locking the upper track, to which the seat construction is rigidly secured, in predetermined position. This means is illustrated as comprising a bracket 100 secured to the upper left hand track 14 and including depending flanges 102 and 104. Pivoted to the depending flange 104 is a bell crank lever 106 having a tension spring 108 surrounding the shaft 110 of a latch release lever 112 to which the bell crank lever 106 is connected. The bell crank lever 106 includes a latch portion 114 which is movable in an arc as the lever 106 is oscillated. The upper corner of the latch portion 114 is engageable in a selected one of the notches 26 provided along the inner side of the left hand track 10, the lower track member 34 of the intermediate track 12 having the previously described cut-away portion 40 to receive the latch portion. The upper track member 32 of the intermediate track 12 is not provided with a similar cut-away edge portion and accordingly serves as an abutment against which the latch portion 114 engages when in latching position.

The right hand upper track 14 is provided with a bracket 116 having a mounting pin 118 carrying a latch lever 120 which includes a latch portion 122 similarly engageable in notches provided along the outer edge of the right hand lower track 10. Levers 106 and 120 are interconnected by a link 124 and a separate bias spring 126 is provided biasing the latch lever 120 in a counter-clockwise direction, as seen in Figure 5. Thus, operation of the latch release lever 112 swings both bell crank levers 106 and 120 to move the latch portions thereof downwardly out of engagement with the selected notches 26, after which the seat may be adjusted manually to the required position. When the latch release lever is freed, the springs 108 and 126 return the latch levers to latching position and lock the upper rail or track 14 in adjusted position.

The drawings and the foregoing specification constitute a description of the improved adjustable seat track assembly in such full, clear, concise and exact terms as to enable any person skilled in the art to practice the invention, the scope of which is indicated by the appended claims.

What I claim as my invention is:

1. An adjustable seat track assembly comprising lower, intermediate and upper tracks, means integral with said tracks defining longitudinally extending pairs of raceways between said lower and intermediate tracks and between said intermediate and upper tracks and defining bearing abutments at the ends of said raceways, said raceways being of lengths substantially less than half the length of said tracks and including end abutment surfaces, and pairs of rolling bearing elements in said raceways.

2. An assembly as defined in claim 1 in which said upper and lower tracks are formed of channel sections having laterally extending flanges, and said intermediate track comprises upwardly and inwardly turned retaining flanges overlying the edges of the flanges of said upper track and downwardly and inwardly turned flanges underlying the edges of the flanges on said lower track.

3. An assembly as defined in claim 2 in which said tracks are formed of sheet metal having central webs and said raceways are formed by embossments on the webs of said tracks.

4. An assembly as defined in claim 2 in which said intermediate track comprises a pair of embossed strips permanently secured together in overlying relation, the edges of said upper strip being turned upwardly and inwardly and the edges of said lower strip being turned downwardly and inwardly.

5. An adjustable seat track assembly comprising lower, intermediate and upper tracks, cooperating embossments adjacent the end of each track shaped to provide longitudinally extending bearing receiving raceways, said embossments including longitudinally extending portions constituting bearing separators, and laterally extending portions adjacent the ends thereof constituting bearing abutments, the ends of said upper and lower tracks having bolt receiving openings extending therethrough in such position that the heads of bolts inserted therethrough are in position to constitute bearing abutments, said openings being exposed by relative movement of said tracks to approximately limiting position to provide for sequential insertion of the bearings and bolts, whereby the bearings may be conveniently inserted and retained in place after assembly of the several tracks.

6. In a seat track assembly, a pair of elongated tracks interconnected at the edge portions to provide for relatively longitudinal sliding movement therebetween, said tracks having webs intermediate the edges thereof spaced apart for the reception of balls therebetween, the web of one of said tracks having a longitudinally extending embossment extending toward the other track and defining a ball separator, said embossment being laterally enlarged at one end to form ball abutments to limit relative longitudinal movement between said tracks, and balls in the space between said webs at opposite sides of said ball separator.

7. An assembly as defined in claim 6, the web of said other track having an embossment therein extending toward said one track and extending laterally into the path of movement of said balls to form a ball abutment.

8. An assembly as defined in claim 7, said last recited embossment being spaced inwardly from the end of said other track, the web of said other track having an opening therethrough adjacent its end, a headed fastening element in the opening, the head of said element constituting a second ball abutment when inserted, and providing for insertion of balls from the end of said assembly before insertion of the fastening element.

9. An adjustable seat track assembly comprising a lower fixed track, an intermediate track slidable longitudinally on said lower track, an upper track slidable longitudinally on said intermediate track, said lower track having a laterally outwardly extending flange provided with a series of notches, said intermediate track having a pair of outwardly extending vertically spaced flanges at the side thereof adjacent the notched flange of said lower track, the lower of said pair of flanges being reversely bent around the free edge of the notched flange of said lower track, a longitudinally extending portion of said lower flange being cut away to expose the notches, said upper track having laterally extending flanges, the upper flange of said intermediate track being reversely bent around the adjacent flange of said upper track, a bracket on said upper track, a bell crank pivoted to said bracket for swinging movement about an axis parallel to said tracks, said bell crank having an arm extending toward said tracks and movable vertically through the cut away portion of the lower flange of said intermediate track into a notch in the flange of said lower track and into abutment with the upper flange of said intermediate track.

10. An adjustable seat track assembly comprising lower, intermediate, and upper tracks each having horizontal ball-engaging webs, said intermediate track having adjacent each end a longitudinally extending ball separator and laterally extending ball-engaging abutments, said upper and lower tracks having a ball-engaging abutment spaced inwardly from each end and an opening adjacent each end, said upper and lower tracks being oppositely movable from an intermediate position relative to said intermediate track to positions in which the ends of said upper and lower tracks lie between the laterally extending abutments at the ends of said ball separators to provide for insertion of four pairs of balls by effecting such relative movement first in one direction and then in the other, and headed fastening elements extending through said openings in the upper and lower tracks, said elements being insertable when said tracks are fully extended from intermediate position, the heads of said elements constituting ball-abutments, the element-receiving openings overlying the web of said intermediate track when said tracks are in said intermediate position.

References Cited in the file of this patent

UNITED STATES PATENTS

| 2,151,419 | Buchner | Mar. 21, 1939 |
| 2,195,349 | Woina | Mar. 26, 1940 |
| 2,606,090 | Straubel | Aug. 5, 1952 |
| 2,622,940 | Johnson | Dec. 23, 1952 |
| 2,628,135 | Magee | Feb. 10, 1953 |
| 2,692,170 | Penkala | Oct. 19, 1954 |

FOREIGN PATENTS

| 898,298 | France | Apr. 18, 1945 |